United States Patent
Boulos et al.

(10) Patent No.: US 6,821,918 B2
(45) Date of Patent: Nov. 23, 2004

(54) GRAY AND BRONZE GLASS COMPOSITION

(75) Inventors: Edward Nashed Boulos, Troy, MI (US); James Victor Jones, Nashville, TN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/301,278

(22) Filed: Nov. 21, 2002

(65) Prior Publication Data

US 2004/0102304 A1 May 27, 2004

(51) Int. Cl.$^7$ .......................... C03C 3/078; C03C 4/10; C03C 4/08
(52) U.S. Cl. .......................... 501/70; 501/71; 501/904; 501/905
(58) Field of Search .......................... 501/70, 71, 904, 501/905

(56) References Cited

U.S. PATENT DOCUMENTS

| | | | |
|---|---|---|---|
| 5,264,400 A | * 11/1993 | Nakaguchi et al. | 501/71 |
| 5,278,108 A | 1/1994 | Cheng et al. | |
| 5,364,820 A | * 11/1994 | Morimoto et al. | 501/71 |
| 5,521,128 A | 5/1996 | Jones et al. | |
| 5,558,942 A | * 9/1996 | Itoh et al. | 428/426 |
| 5,565,388 A | * 10/1996 | Krumwiede et al. | 501/70 |
| 5,656,560 A | * 8/1997 | Stotzel et al. | 501/72 |
| 5,725,628 A | * 3/1998 | Boulos et al. | 65/134.1 |
| 5,908,702 A | * 6/1999 | Mita et al. | 428/426 |
| 5,962,356 A | 10/1999 | Boulos et al. | |
| 6,080,694 A | 6/2000 | Boulos et al. | |
| 6,114,264 A | * 9/2000 | Krumwiede et al. | 501/70 |
| 6,498,118 B1 | * 12/2002 | Landa et al. | 501/64 |
| 6,521,558 B2 | * 2/2003 | Landa et al. | 501/64 |
| 6,573,207 B2 | * 6/2003 | Landa et al. | 501/64 |
| 2002/0155938 A1 | * 10/2002 | Landa et al. | 501/64 |

FOREIGN PATENT DOCUMENTS

| | | |
|---|---|---|
| EP | 0 561 337 A1 | 9/1993 |
| EP | 0 619 274 A1 | 10/1994 |
| EP | 0 677 492 A1 | 10/1995 |
| GB | 2 274 841 A | 8/1994 |

OTHER PUBLICATIONS

Derwent Publication XP–002271827, London, GB—Section Ch, Week 198727, Nov. 15, 1986, AN 1987–190476.
International Publication No. WO 99/48825, International Application No. PCT/GB99/00483, International Publication Date Sep. 30, 1999, Title: A Medium Gray Colored Glass with Improved UV and IR Absorption and Nitrate–Free Manufacturing Process Therefor, Applicant: Ford Motor Co.

* cited by examiner

*Primary Examiner*—Karl Group
*Assistant Examiner*—Elizabeth A. Bolden
(74) *Attorney, Agent, or Firm*—Brinks Hofer Gilson & Lione

(57) ABSTRACT

The present invention is a bronze and gray glass composition. The composition comprises 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%, and colorants comprising: 0.22 to 0.39 wt. % total iron as $Fe_2O_3$ wherein the ratio of FeO/total Fe as $Fe_2O_3$ is 0.35 to 0.64; 0.1 to 0.5 wt. % manganese compound as $MnO_2$; 0 to 1.2 wt. % cerium oxide as $CeO_2$; and 2 to 10 ppm selenium, and 0 to 20 ppm cobalt as cobalt oxide. The colored glass has the following spectral properties at 4.0 mm. thickness: 65 to 78% light transmittance using Illuminant A (LTA) and using Illuminant C has a dominant wavelength of 493 to 577 nanometers with an excitation purity up to 7%.

15 Claims, No Drawings

GRAY AND BRONZE GLASS COMPOSITION

TECHNICAL FIELD OF THE INVENTION

The invention is directed to gray and bronze glass compositions having a high transmittance and a high infrared absorption and method of producing the gray and bronze glass.

BACKGROUND OF THE INVENTION

It would be extremely advantageous to improve the infrared absorption of glass products while maintaining a high level of visible transmission and to also have a good absorption in the ultraviolet portion of the spectrum. Iron oxide exists in two chemical forms in the glass, an oxidized form which is yellow, $Fe_2O_3$, and a reduced form which is blue FeO. Advantageously, the oxidized form of iron oxide absorbs a portion of the ultraviolet light passing through the glass product and the reduced form of iron oxide absorbs a portion of the infrared light passing through the glass product. Under typical furnace firing conditions and batching conditions, when the total iron oxide in the glass product is within the range of about 0.2 to 1.2 wt. % as $Fe_2O_3$, the iron oxide equilibrium is such that the redox ratio of FeO/total Fe as $Fe_2O_3$ is about 0.18–0.26.

It is desirable to increase the proportion of reduced iron oxide (FeO) in the glass to improve its infrared absorption. In addition, by shifting the iron oxide away from the oxidized form ($Fe_2O_3$) the glass will change color from green to blue. It would be further desirable to shift the blue glass towards a gray or a bronze color and to simultaneously improve the ultra violet absorption as well as the infrared absorption.

One way commonly employed to shift the redox equilibrium of iron oxide in the glass, and hence its UV and IR properties, is by increasing the fuel to the furnace. Increasing the amount of fuel, however, has several undesirable consequences: the combustion heating of the furnace becomes inefficient and requires an air increase or the unburnt fuel will burn in the checker system of the furnace. Excess fuel can also reduce the glass to an amber color that sharply lowers the visible transmittance of the glass product.

An amber color arises when the iron reacts with sulfur that has been reduced to form iron sulfide. Amber colored glass containers are normally melted in like manner by using anthracite coal together with iron oxide and sulfate. The amber iron sulfide chromophore, once produced, significantly decreases the visible transmittance of the glass and the glass could not be used where a high transmittance is required.

Therefore, there is a need in the glass industry to produce gray or bronze glass that has high transmittance yet having an improved infrared light absorption and an ultra violet absorption.

SUMMARY OF THE INVENTION

In one aspect of the present invention a gray and a bronze glass having a base and a colorant is provided. The composition of the base comprises 68 to 75% $SiO_2$, 10 to 18 wt. % $Na_2O$, 5 to 15 wt. % CaO, 0 to 10 wt. % MgO, 0 to 5 wt. % $Al_2O_3$, and 0 to 5 wt. % $K_2O$, where CaO+MgO is 6 to 15 wt. % and $Na_2O+K_2O$ is 10 to 20 wt. % is provided. The composition of the colorants comprises: 0.22 to 0.39 wt. % total iron as $Fe_2O_3$ wherein the ratio of FeO/total Fe as $Fe_2O_3$ is 0.35 to 0.64; 0.1 to 0.5 wt. % manganese compound as $MnO_2$; 0 to 1.2 wt. % cerium oxide as $CeO_2$; and 2 to 10 ppm selenium, and 0 to 20 ppm cobalt as cobalt oxide.

In yet another aspect of the present invention glass products made according to the embodiment of the invention have the following spectral properties at 4.0 mm. thickness: 65 to 78% light transmittance using Illuminant A (LTA) and using Illuminant C has a dominant wavelength greater than 493 but less than or equal to 577 nanometers with an excitation purity less than 7%. Generally, as the quantities of the colorants increase, both the % LTA and % IR transmittance will go down. Similarly, as the glass thickness increases for a given glass composition, the transmittance of the thicker glass will decrease.

In yet another aspect of the present invention wherein the colored glass of the present invention exhibits an bronze color when the excitation purity is in the range of 2% to 7% and has a dominant wavelength in the range of 560 to 577 nanometers. In yet another aspect of the present invention the colored glass exhibits a gray color when the excitation purity is less than 2% and the dominant wavelength is in the range of 493 to 551 nanometers.

DETAILED DESCRIPTION OF THE PREFERRED EMBODIMENT

Flat soda-lime-silica glass, used in the automotive and architectural industries and conveniently made by the float glass process, is generally characterized by the following basic composition, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The gray and bronze glass composition of the present invention employs this basic soda-lime-silica glass composition wherein, additionally, CaO+MgO is 6 to 15 wt. % and $Na_2O+K_2O$ is 10 to 20 wt. %. Preferably $SO_3$ is present in an amount of 0.03 to 0.20 wt %, more preferably, 0.03 to 0.10 wt. % in the final glass product. In addition, the gray and bronze glass composition consists essentially of the following coloring components: iron oxide; selenium, manganese compound; and optionally one of cobalt oxide or cerium oxide or both.

The total iron as $Fe_2O_3$ is present in the invention composition in quantities of 0.22 to 0.39 wt. % $Fe_2O_3$. Typically, this ingredient is added with the batch ingredients in the oxide form, i.e. $Fe_2O_3$. The iron oxide incorporated in the composition lowers both the ultraviolet and the infrared transmittance of the glass products. When iron oxide is used in a glass composition in normal commercial production, the redox ratio defined as equal to FeO/total iron (Fe) as $Fe_2O_3$ In commercial glass products available today this redox ratio is in the range of is 0.18–0.26. On the other hand, the glass of the present invention has a high redox ratio, in the range of 0.35–0.64. If the redox ratio goes above 0.65, the undesirable amber chromophore may form and therefore the light transmittance of the glass will be reduced.

The glass of the invention is manufactured by one step batch admixing of the components to feed a conventional SIEMENS float glass furnace. Sodium sulfate is mixed in the batch together with anthracite coal to shift the iron oxide equilibrium toward the reduced form of iron (FeO). Manganese dioxide is necessary in the batch to prevent the formation of the amber iron sulfide and to aid in the retention of the selenium. All of the batch components are mixed together in a single step and then metered into the furnace. In glass product made with this method cerium oxide improves the ultra violet absorption of the glass. Selenium moves the color towards bronze and cobalt lowers the dominant wavelength and excitation purity.

When glass products made in this manner are used in vehicles, the bronze and gray glass absorbs solar heat and there is relatively less total heat build up in the vehicle. The load on vehicle air conditioners is reduced such that there is less heat build up to cool and comfort to the passengers occurs quickly. Glass made with the instant invention can also be used for architectural products and provides a similar reduction in air conditioner load.

A manganese compound is present in an amount of 0.1 to 0.5 wt. % based on $MnO_2$ in the glass composition. The presence of manganese substantially prevents the formation of the amber color. This manganese compound can be added to the batch glass components in a variety forms, e.g., but not limited to $MnO_2$, $Mn_3O_4$, $MnO$, $MnCO_3$, $MnSO_4$, $MnF_2$, $MnCl_2$, etc.

Table II discloses the amounts of raw material batch ingredients that are preferably used to form the gray and bronze glass compositions according to the present invention. The present invention uses identical amount of raw material to form both the gray glass and the bronze glass.

TABLE II

| Batch Material | Range Mass (Lbs) |
| --- | --- |
| Sand | 1000 |
| Soda Ash | 290 to 350 |
| Limestone | 70 to 90 |
| Dolomite | 215 to 260 |
| Salt cake | 2.5 to 11 |
| Rouge (97% $Fe_2O_3$) | 3.5 to 6.0 |
| Manganese Dioxide | 1.3 to 7.0 |
| Selenium | 0.05 to 0.50 |
| Cerium Oxide | 0 to 16.0 |
| Cobalt Oxide | 0 to 0.04 |
| Anthracite coal | 0.9 to 2.5 |
| Nepheline Syenite | 0 to 150 |

The anthracite coal is preferably bought under the tradename CARBOCITE and is commercially available from the Shamokin Filler Company. Graphite could be used as a substitute for anthracite coal in an amount of about 70% that of anthracite coal because anthracite coal contains about 70–72% carbon. If graphite is used, the typical range would be from 0.7 to 2.1 pounds of graphite per 1000 pounds of sand. MELITE, a coal slag processed by Calumite Corporation could partially or wholly substitute for rouge in the batch up to about 55 pounds MELITE per 1000 pounds of sand. MELITE has about 80% of the total iron oxide in the reduced form and thus would require less anthracite coal to generate similar spectral properties.

The equilibrium reactions that occur in the glass melt which causes a shift in the forms of iron oxide are influenced by the sodium sulfate used as a refining agent and carbon used to react with sodium sulfate at lower furnace temperatures. Generally, increasing the quantity of sodium sulfate in the glass tends to shift the iron oxide equilibrium slightly toward oxidizing. On the other hand, increasing carbon concentration in the glass batch shifts the iron oxide equilibrium toward reducing form of iron. Increasing the amount of Manganese oxide shifts the iron oxide equilibrium again towards the oxide form. Another influence on the iron oxide equilibrium is the peak furnace temperature which, when increased will shift the iron oxide slightly toward the reduced state and lowering overall furnace temperature allows the iron oxide to shift back towards the oxidized state.

The colored glass obtained in accordance with the teachings of the present invention exhibits the following spectral properties at 4 mm. control thickness has a light transmittance using illuminant A in a range of 65% to 78%, an infrared transmittance in the range of 22% to 51% and an ultraviolet transmittance in the range of 35% to 62%.

Melts were made in the laboratory which demonstrate embodiments of this invention using the procedure as follows: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5" and is tapered to the base which has an inside diameter of 1.75". An amount of 4.5 ml. of water is added to the dry batch in the crucible and mixed with a metal spoon. After such preparation, a group of six different batches is melted in a gas/air fired surface at the same time for 1 hour at 2600° F. and each crucible is removed in turn from the furnace and fritted. Fritting the glass involves coating the inside of the platinum/rhodium crucible by rolling the molten glass around the inside of the crucible and then plunging the crucible into cold water. After removing the crucible from the water and draining, the broken glass particles are removed from the sides of the crucible and mechanically mixed inside the crucible. All six samples are fritted in like manner and all crucibles are placed back into the furnace for another hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All laboratory melts made with above procedure use a base composition of 100 grams sand, 32.22 grams soda ash, 8.81 grams limestone, 23.09 grams dolomite, 0.25 to 1.1 grams of sodium sulfate, 0.09 to 0.25 grams of CARBOCITE, 2.64 grams of nepheline syenite, and the remainder of the batch includes rouge, manganese dioxide, selenium and optionally cobalt oxide and cerium oxide if required.

In each of the following tables of examples with the glass composition includes spectral data at 4.0 mm, which is the control thickness. The % LTA is defined to be the % luminance transmittance measured under CIE standard illuminant A. The dominant wavelength and the % excitation purity are measured using CIE standard illuminant C. The % UV is the % ultra violet transmittance measured between 300 and 400 nanometers and % IR is the % infra red transmittance measured between 750 and 2100 nanometers.

Tables III to VI represent the bronze glass composition of the present invention. As can be seen from the Tables, the glass exhibits a bronze color when the excitation purity is in the range of 2% to 7%. Additionally, the dominant wavelength of the bronze glass is in the range of 560 nm to 575 nm.

As shown in Table III, as the amount of selenium is increased and the amount of FeO is decreased, results in increase in the % LTA of the glass. However, the UV transmittance and the IR transmittance also increases. All the spectral properties are listed at a control thickness of 4.0 mm.

TABLE III

| | Example | | | | | | | |
|---|---|---|---|---|---|---|---|---|
| | 1 | 2 | 3 | 4 | 5 | 6 | 7 | 8 |
| Wt. % $Fe_2O_3$ | 0.353 | 0.352 | 0.251 | 0.301 | 0.301 | 0.301 | 0.25 | .03 |
| Wt. % FeO | 0.198 | 0.195 | 0.148 | 0.156 | 0.158 | 0.164 | 0.159 | 0.174 |
| Redox Ratio | 0.561 | 0.554 | 0.590 | 0.518 | 0.525 | 0.545 | 0.636 | 0.580 |
| Wt. % $MnO_2$ | 0.151 | 0.151 | 0.151 | 0.151 | 0.151 | 0.151 | 0.101 | 0.451 |
| PPM SE | 2 | 3 | 3 | 4 | 4 | 4 | 6 | 6 |
| % LTA | 67.66 | 66.82 | 74.03 | 69.36 | 69.9 | 68.87 | 72.44 | 71.68 |
| % LTC | 67.85 | 66.9 | 74.35 | 69.26 | 69.8 | 68.75 | 72.55 | 71.94 |
| % UV | 41.17 | 49.99 | 52.75 | 52.13 | 53.08 | 51.89 | 55.78 | 53.61 |
| % INFRA RED | 26.25 | 26.71 | 35.57 | 33.9 | 33.5 | 32.4 | 34.18 | 30.61 |
| % TOTAL SOLAR | 43.99 | 44.5 | 52.24 | 49.65 | 49.65 | 48.59 | 52.15 | 48.83 |
| Dominant Wavelength | 564 | 565.1 | 561.7 | 568.6 | 568.7 | 569.7 | 562.7 | 561 |
| % Excitation Purity | 6.4 | 4.5 | 5.4 | 4.5 | 4.7 | 5.1 | 2.3 | 3.9 |

Table IV shows the effect of cobalt on the excitation purity and the % LTA. As seen from the examples, as the amount of cobalt is increased at constant amount of selenium and manganese oxide, the % excitation purity decreases and the % LTA significantly increases. The increase in the amount of cobalt lowers the UV transmittance, however increases the IR transmittance.

TABLE IV

| | Example | | | | | | | | |
|---|---|---|---|---|---|---|---|---|---|
| | 9 | 10 | 11 | 12 | 13 | 14 | 15 | 16 | 17 |
| Wt. % $Fe_2O_3$ | 0.354 | 0.354 | 0.377 | 0.303 | 0.302 | 0.303 | 0.303 | 0.304 | 0.302 |
| Wt. % FeO | 0.165 | 0.164 | 0.224 | 0.117 | 0.141 | 0.128 | 0.117 | 0.099 | 0.136 |
| Redox Ratio | 0.466 | 0.463 | 0.594 | 0.386 | 0.467 | 0.422 | 0.386 | 0.326 | 0.450 |
| Wt. % $MnO_2$ | 0.151 | 0.152 | 0.151 | 0.151 | 0.151 | 0.15 | 0.152 | 0.151 | 0.151 |
| PPM SE | 3 | 4 | 2 | 2 | 4 | 4 | 4 | 2 | 4 |
| PPM CO* | 1 | 1 | 3 | 12 | 12 | 12 | 12 | 13 | 13 |
| Dominant Wavelength | 564.8 | 565.9 | 561.4 | 562.3 | 561.8 | 570.9 | 573.5 | 574.4 | 563.9 |
| % Excitation Purity | 3.6 | 3.8 | 5.7 | 2.1 | 2.2 | 3.8 | 4.6 | 4.9 | 2.4 |
| % LTA | 69.69 | 69.09 | 65.33 | 70.35 | 67.3 | 66.34 | 67.06 | 67.08 | 67.85 |
| % LTC | 69.77 | 69.112 | 65.65 | 70.46 | 67.43 | 66.17 | 66.73 | 66.67 | 67.93 |
| % UV | 51.15 | 50.37 | 47.24 | 45.87 | 49.29 | 43.76 | 42.4 | 39.48 | 47.73 |
| % INFRA RED | 32.21 | 32.34 | 22.58 | 43.29 | 37.18 | 40.16 | 43 | 48.09 | 38.33 |
| % TOTAL SOLAR | 48.94 | 48.71 | 41.25 | 55.46 | 50.84 | 51.8 | 53.57 | 56.1 | 51.71 |

Table V shows that both selenium and cerium oxide increase the dominant wavelength of the glass. On the other hand as seen from the examples, increasing the amount of manganese oxide and cerium oxide lowers the ultra violet transmittance, in other words, the ultra violet absorption can be improved.

TABLE V

| | Example | | | | | |
|---|---|---|---|---|---|---|
| | 18 | 19 | 20 | 21 | 22 | 23 |
| Wt. % $Fe_2O_3$ | 0.25 | 0.3 | 0.352 | 0.351 | 0.351 | 0.351 |
| Wt. % FeO | 0.159 | 0.174 | 0.195 | 0.141 | 0.123 | 0.125 |
| Redox Ratio | 0.636 | 0.580 | 0.554 | 0.402 | 0.350 | 0.356 |
| Wt. % $MnO_2$ | 0.101 | 0.451 | 0.151 | 0.15 | 0.151 | 0.151 |
| Wt. % $CeO_2$ | 0 | 0 | 0 | 0.504 | 1.009 | 1.009 |
| PPM SE | 6 | 6 | 3 | 8 | 5 | 8 |
| Dominant Wavelength | 562.7 | 561 | 565.1 | 569.2 | 570.8 | 573.3 |
| % Excitation Purity | 2.3 | 3.9 | 4.5 | 4.7 | 5.2 | 6.6 |

TABLE V-continued

| | Example | | | | | |
|---|---|---|---|---|---|---|
| | 18 | 19 | 20 | 21 | 22 | 23 |
| % LTA | 72.44 | 71.68 | 66.82 | 71.43 | 72.71 | 71.61 |
| % LTC | 72.55 | 71.94 | 66.82 | 71.43 | 72.71 | 71.61 |
| % UV | 55.78 | 53.61 | 49.99 | 42.48 | 38.85 | 37.89 |
| % INFRA RED | 34.18 | 30.61 | 26.71 | 37.31 | 41.53 | 41.26 |
| TOTAL SOLAR | 52.15 | 48.83 | 44.5 | 52.12 | 54.8 | 54.06 |

Table VI below indicates the impact of cerium oxide on glass compositions to improve the % LTA of the glass. Increasing the cerium oxide helps to oxidize the iron oxide and that increases the transmittance in the visible portion of the spectrum and that is critical when the finished glass product is to be used in automotive applications. Examples 25 and 26 clearly indicate that an increase in the amount of cerium oxide, when all other components of the composition are constant, results in % LTA to increase from 66.42 to 70.45. The presence of cerium oxide also lowers the ultra violet transmittance.

As demonstrated in Tables VII and VIII, increase in the amount of selenium and a decrease in the amount of FeO increases the light transmittance in the visible spectrum. It also lowers the amount of ultra violet transmittance

TABLE VI

| | Example | | | | | | | |
|---|---|---|---|---|---|---|---|---|
| | 24 | 25 | 26 | 27 | 28 | 29 | 30 | 31 |
| Wt. % $Fe_2O_3$ | 0.301 | 0.301 | 0.301 | 0.302 | 0.302 | 0.301 | 0.301 | 0.302 |
| Wt. % FeO | 0.136 | 0.143 | 0.108 | 0.118 | 0.121 | 0.109 | 0.092 | 0.11 |
| Redox Ratio | 0.452 | 0.475 | 0.359 | 0.391 | 0.401 | 0.362 | 0.306 | 0.364 |
| Wt. % $MnO_2$ | 0.151 | 0.151 | 0.151 | 0.151 | 0.15 | 0.15 | 0.15 | 0.151 |
| Wt. % $CEO_2$ | 0.202 | 0.203 | 0.403 | 0.404 | 0.405 | 0.606 | 0.606 | 0.606 |
| PPM SE | 4 | 4 | 4 | 4 | 4 | 4 | 4 | 4 |
| PPM CO | 13 | 12 | 12 | 12 | 13 | 12 | 12 | 12 |
| Dominant Wavelength | 568.8 | 563.9 | 562.1 | 575.1 | 571.6 | 565.6 | 572.9 | 576.7 |
| % Excitation Purity | 3.3 | 2.5 | 2.1 | 5.9 | 3.9 | 2.5 | 4 | 7 |
| % LTA | 66.1 | 66.42 | 70.45 | 65.6 | 66.61 | 70.14 | 69.69 | 65.56 |
| % LTC | 66.03 | 66.5 | 70.56 | 65.08 | 66.4 | 70.17 | 69.4 | 64.83 |
| % UV | 45.65 | 46.66 | 44.88 | 40.29 | 42.45 | 42.96 | 41.13 | 38.34 |
| % IR | 38.21 | 36.63 | 45.57 | 42.71 | 42.08 | 45.34 | 50.32 | 44.95 |
| % TOTAL SOLAR | 50.74 | 50.12 | 56.61 | 52.55 | 52.89 | 56.31 | 58.59 | 53.61 |

Tables VII to XIV are examples of the gray glass composition of the present invention. The gray glass is also manufactures using the same colorants as the bronze glass. The gray glass is characterized by a low excitation purity of less than 2%.

however, has an undesirable effect of increasing the infra red transmittance. The increase in selenium also has the effect of increasing the excitation purity. The dominant wavelength and excitation purity are important because they define the color of the glass.

TABLE VII

| | Example | | | | | | | |
|---|---|---|---|---|---|---|---|---|
| | 32 | 33 | 34 | 35 | 36 | 37 | 38 | 39 |
| Wt. % $Fe_2O_3$ | 0.352 | 0.352 | 0.301 | 0.301 | 0.353 | 0.354 | 0.352 | 0.351 |
| Wt. % FeO | 0.166 | 0.186 | 0.167 | 0.167 | 0.181 | 0.189 | 0.172 | 0.153 |
| Redox Ratio | 0.472 | 0.528 | 0.555 | 0.555 | 0.513 | 0.534 | 0.489 | 0.436 |
| Wt. % $MnO_2$ | 0.151 | 0.151 | 0.451 | 0.451 | 0.151 | 0.152 | 0.152 | 0.151 |
| PPM SE | 7 | 2 | 4 | 4 | 2 | 2 | 2 | 2 |
| Dominant Wavelength | 499.7 | 530 | 536 | 536 | 503 | 503.2 | 505.4 | 506.9 |
| % Excitation Purity | 1.9 | 1.4 | 1.6 | 1.6 | 1.7 | 1.8 | 1.4 | 1.2 |
| % LTA | 74.63 | 71.27 | 73.9 | 73.9 | 72.69 | 72.37 | 73.52 | 74.75 |
| % LTC | 75.55 | 71.88 | 74.49 | 74.49 | 73.59 | 73.33 | 74.3 | 75.48 |
| % UV | 52.55 | 55.5 | 57.23 | 57.23 | 48.31 | 46.56 | 57.25 | 57.07 |
| % IR | 31.92 | 28.31 | 31.88 | 31.88 | 29.04 | 27.7 | 30.96 | 34.55 |
| % TOTAL SOLAR | 51.29 | 47.77 | 50.9 | 50.9 | 48.7 | 47.75 | 50.36 | 52.88 |

TABLE VIII

| | Example | | | | | | |
|---|---|---|---|---|---|---|---|
| | 40 | 41 | 42 | 43 | 44 | 45 | 46 |
| Wt. % $Fe_2O_3$ | 0.352 | 0.351 | 0.353 | 0.352 | 0.352 | 0.351 | 0.301 |
| Wt. % FeO | 0.184 | 0.148 | 0.205 | 0.185 | 0.153 | 0.152 | 0.139 |
| Redox Ratio | 0.523 | 0.422 | 0.581 | 0.526 | 0.435 | 0.433 | 0.462 |
| Wt. % $MnO_2$ | 0.151 | 0.151 | 0.151 | 0.151 | 0.151 | 0.151 | 0.151 |
| PPM SE | 2 | 3 | 1 | 3 | 4 | 3 | 2 |
| Dominant Wavelength | 525.4 | 525.9 | 526.1 | 529.5 | 536.3 | 538.6 | 545.9 |

TABLE VIII-continued

| | Example | | | | | | |
|---|---|---|---|---|---|---|---|
| | 40 | 41 | 42 | 43 | 44 | 45 | 46 |
| % Excitation Purity | 1.3 | 1.1 | 1.8 | 1.4 | 1.4 | 1.5 | 1.6 |
| % LTA | 71.23 | 73.14 | 71.09 | 70.89 | 72.65 | 72.25 | 74.2 |
| % LTC | 71.86 | 73.7 | 71.94 | 71.51 | 73.15 | 72.75 | 74.62 |
| % UV | 55.36 | 54.96 | 49.01 | 54.47 | 54.72 | 53.4 | 56.96 |
| % IR | 28.66 | 35.46 | 25.36 | 28.41 | 34.62 | 34.63 | 37.53 |
| % TOTAL SOLAR | 47.95 | 52.51 | 45.73 | 47.65 | 51.81 | 51.61 | 54.09 |

As seen from the experiments shown in Table IX, increasing the amount of cobalt and decreasing the amount of FeO, results in lowering the excitation purity as seen in examples 52 and 54. As can be seen from the above examples it does not significantly change the % LTA. Similarly as can been seen in examples 59 and 60 in Table X, increasing the amount of cobalt and selenium, results in increase in excitation purity from 1.1 to 1.6. Although there is an increase in the excitation purity, since the excitation purity is less than 2%, the color of the glass remains gray. The increase in both selenium and cobalt also results in increase in UV transmittance and a increase in % LTA.

TABLE IX

| | Example | | | | | | | |
|---|---|---|---|---|---|---|---|---|
| | 47 | 48 | 49 | 50 | 51 | 52 | 53 | 54 |
| Wt. % $Fe_2O_3$ | 0.354 | 0.355 | 0.355 | 0.355 | 0.355 | 0.251 | 0.271 | 0.291 |
| Wt. % FeO | 0.166 | 0.155 | 0.14 | 0.139 | 0.14 | 0.112 | 0.135 | 0.159 |
| Redox Ratio | 0.469 | 0.437 | 0.394 | 0.392 | 0.394 | 0.446 | 0.498 | 0.546 |
| Wt. % $MnO_2$ | 0.151 | 0.151 | 0.151 | 0.151 | 0.151 | 0.151 | 0.151 | 0.151 |
| PPM SE | 2 | 3 | 2 | 3 | 4 | 3 | 3 | 3 |
| PPM CO | 1 | 2 | 2 | 2 | 2 | 3 | 4 | 5 |
| Dominant Wavelength | 519.5 | 520.8 | 523.3 | 541.3 | 544.1 | 494.7 | 500 | 505 |
| % Excitation Purity | 1.1 | 1.1 | 1.1 | 1.5 | 1.6 | 1.5 | 1.5 | 0.5 |
| % LTA | 72.79 | 72.28 | 73.98 | 73.49 | 72.3 | 72.62 | 74.88 | 72.67 |
| % LTC | 73.41 | 72.87 | 74.54 | 73.95 | 72.73 | 73.22 | 75.64 | 73.51 |
| % UV | 55.55 | 54.44 | 54.68 | 53.68 | 52.59 | 60.18 | 60.87 | 58.05 |
| % IR | 32.04 | 34.03 | 37.42 | 37.64 | 37.26 | 44.33 | 38.49 | 33.24 |
| % TOTAL SOLAR | 50.57 | 51.41 | 54.01 | 53.79 | 53.02 | 57.64 | 55.27 | 51.27 |

TABLE X

| | Example | | | | | | | |
|---|---|---|---|---|---|---|---|---|
| | 55 | 56 | 57 | 58 | 59 | 60 | 61 | 62 |
| Wt. % $Fe_2O_3$ | 0.311 | 0.29 | 0.271 | 0.302 | 0.303 | 0.271 | 0.25 | 0.291 |
| Wt. % FeO | 0.178 | 0.14 | 0.121 | 0.137 | 0.128 | 0.127 | 0.112 | 0.147 |
| Redox Ratio | 0.572 | 0.483 | 0.446 | 0.454 | 0.422 | 0.469 | 0.448 | 0.505 |
| Wt. % $MnO_2$ | 0.151 | 0.151 | 0.15 | 0.151 | 0.152 | 0.151 | 0.151 | 0.151 |
| PPM SE | 3 | 3 | 3 | 2 | 2 | 3 | 4 | 5 |
| PPM CO | 5 | 8 | 9 | 12 | 12 | 13 | 15 | 16 |
| Dominant Wavelength | 533 | 497 | 503.6 | 525.6 | 544 | 495.5 | 493.3 | 496.4 |
| % Excitation Purity | 1.9 | 1.8 | 1 | 0.8 | 1.1 | 1.6 | 1.6 | 1.6 |
| % LTA | 70.75 | 73.55 | 74.44 | 69.73 | 69.8 | 71.43 | 72.28 | 67.82 |
| % LTC | 71.51 | 74.33 | 75.02 | 70.13 | 70.1 | 72.1 | 72.87 | 68.46 |
| % UV | 54.66 | 59.79 | 59.8 | 49.68 | 47.95 | 58.8 | 60.68 | 56.35 |
| % IR | 29.62 | 37.35 | 42.09 | 38.16 | 40.14 | 40.47 | 44.53 | 35.82 |
| % TOTAL SOLAR | 48.12 | 54.17 | 57.07 | 52.62 | 53.62 | 54.95 | 57.69 | 50.86 |

TABLE XI

| | Example | | | | |
|---|---|---|---|---|---|
| | 63 | 64 | 65 | 66 | 67 |
| Wt. % $Fe_2O_3$ | 0.331 | 0.331 | 0.251 | 0.271 | 0.331 |
| Wt. % FeO | 0.131 | 0.149 | 0.13 | 0.118 | 0.154 |
| Redox Ratio | 0.396 | 0.450 | 0.518 | 0.435 | 0.465 |
| Wt. % $MnO_2$ | 0.151 | 0.151 | 0.151 | 0.151 | 0.151 |
| PPM SE | 4 | 5 | 5 | 4 | 5 |
| PPM CO | 16 | 16 | 16 | 17 | 19 |
| Dominant Wavelength | 499.8 | 500 | 512.1 | 495.9 | 498 |
| % Excitation Purity | 1.1 | 1.3 | 0.7 | 1.3 | 1.5 |
| % LTA | 68.29 | 67.8 | 68.14 | 70.61 | 65.18 |
| % LTC | 68.79 | 68.4 | 68.53 | 71.15 | 65.78 |
| % UV | 56.58 | 54.27 | 56.67 | 58.04 | 52.16 |
| % IR | 39.34 | 35.4 | 39.78 | 42.91 | 34.17 |
| % TOTAL SOLAR | 52.93 | 50.5 | 53.06 | 55.98 | 48.68 |

Table XI above represents the importance of cobalt to obtain the gray glass of the present invention having desired properties. As can be seen from examples 63 and 64, increasing the amount of selenium at constant cobalt, $Fe_2O_3$ and $MnO_2$ results in lowering the % LTA, increasing the excitation purity and decreasing the UV and IR transmittance. On the other hand, as seen from examples 65 and 66 increasing the amount of cobalt and decreasing the amount of selenium and FeO results in increasing the % LTA.

Table XII below shows the effect of $CeO_2$, $MnO_2$, and selenium on the excitation purity and the spectral properties of the glass of the present invention. As can be seen from examples 68 and 70, increasing the amounts of selenium and $CeO_2$ at constant $Fe_2O_3$ results in significance increase the % LTA and the dominant wavelength. It also decreases the amount of UV transmittance. On the other hand, as seen from examples 71 and 72 increasing the amount of $CeO_2$ at constant $MnO_2$, selenium and $Fe_2O_3$, results in decrease in the excitation purity and the dominant wavelength. As can be seen it does not significantly affect the other spectral properties of the glass.

TABLE XII

| | Example | | | | | |
|---|---|---|---|---|---|---|
| | 68 | 69 | 70 | 71 | 72 | 73 |
| Wt. % $Fe_2O_3$ | 0.352 | 0.351 | 0.351 | 0.351 | 0.351 | 0.301 |
| Wt. % FeO | 0.186 | 0.157 | 0.186 | 0.144 | 0.167 | 0.167 |
| Redox Ratio | 0.528 | 0.447 | 0.530 | 0.410 | 0.476 | 0.555 |
| Wt. % $MnO_2$ | 0.151 | 0.151 | 0.151 | 0.151 | 0.151 | 0.451 |
| Wt. % $CeO_2$ | 0 | 0.101 | 0.203 | 0.303 | 0.403 | 0 |
| PPM SE | 2 | 3 | 2 | 3 | 3 | 4 |
| Dominant Wavelength | 530 | 511.2 | 508.9 | 542.6 | 525.4 | 536 |
| % Excitation Purity | 1.4 | 1.1 | 1.7 | 1.6 | 1.2 | 1.6 |
| % LTA | 71.27 | 73.88 | 72.09 | 74.62 | 73.03 | 73.9 |
| % LTC | 71.88 | 74.58 | 72.89 | 75.09 | 73.65 | 74.49 |
| % UV | 55.5 | 52.96 | 50.49 | 48.41 | 47.58 | 57.23 |
| % IR | 28.31 | 33.65 | 28.32 | 36.55 | 31.75 | 31.88 |
| % TOTAL SOLAR | 47.77 | 51.85 | 48.06 | 53.54 | 50.24 | 50.9 |

Table XIII demonstrates the effect of $MnO_2$, $CeO_2$, selenium and cobalt on the spectral properties of the glass. As seen from examples 76 and 77, increasing the amount of cobalt results in decrease in UV and IR transmittance, however results in decrease in % LTA.

TABLE XIII

| | Example | | | | |
|---|---|---|---|---|---|
| | 74 | 75 | 76 | 77 | 78 |
| Wt. % $Fe_2O_3$ | 0.351 | 0.351 | 0.351 | 0.352 | 0.351 |
| Wt. % FeO | 0.168 | 0.173 | 0.178 | 0.2 | 0.19 |
| Redox Ratio | 0.479 | 0.493 | 0.507 | 0.568 | 0.541 |
| Wt. % $MnO_2$ | 0.151 | 0.15 | 0.15 | 0.151 | 0.15 |
| Wt. % $CeO_2$ | 0.202 | 0.404 | 0.403 | 0.605 | 0.403 |
| PPM SE | 3 | 3 | 3 | 2 | 3 |
| PPM CO | 2 | 2 | 6 | 9 | 11 |
| Dominant Wavelength | 503.6 | 504.2 | 513.5 | 525.5 | 504.3 |
| % Excitation Purity | 1.5 | 1.4 | 1.1 | 1.5 | 1.5 |
| % LTA | 72.62 | 71.81 | 68.62 | 65.61 | 67.04 |
| % LTC | 73.4 | 72.59 | 69.25 | 66.28 | 67.78 |
| % UV | 51.15 | 48.07 | 45.64 | 42.16 | 45.68 |
| % IR | 31.73 | 30.58 | 29.59 | 25.86 | 27.69 |
| % TOTAL SOLAR | 50.28 | 49.2 | 47.2 | 43.64 | 45.58 |

As seen from the above, lowering the % UV below 50% requires greater than 0.2 wt. % $M_nO_2$ and $CEO_2$ or the total of the $M_nO_2$ and $CEO_2$ to be 0.45 wt. % or greater.

TABLE XIV

| | Example | | | | | |
|---|---|---|---|---|---|---|
| | 79 | 80 | 81 | 82 | 83 | 84 |
| Wt. % $Fe_2O_3$ | 0.301 | 0.301 | 0.301 | 0.377 | 0.377 | 0.377 |
| Wt. % FeO | 0.137 | 0.138 | 0.121 | 0.167 | 0.172 | 0.178 |
| Redox Ratio | 0.455 | 0.458 | 0.402 | 0.443 | 0.456 | 0.472 |
| Wt. % $MnO_2$ | 0.151 | 0.151 | 0.15 | 0.151 | 0.15 | 0.151 |
| Wt. % $CeO_2$ | 0.202 | 0.203 | 0.404 | 0.505 | 0.607 | 0.405 |
| PPM SE | 4 | 4 | 4 | 2 | 2 | 2 |
| PPM CO | 12 | 12 | 12 | 12 | 12 | 13 |
| Dominant Wavelength | 509.6 | 501.2 | 551.1 | 517.4 | 505.1 | 501.7 |
| % Excitation Purity | 0.8 | 1.2 | 1.4 | 1 | 1.3 | 1.5 |
| % LTA | 69.75 | 70.42 | 69.47 | 66.73 | 67.25 | 66.51 |
| % LTC | 70.23 | 71 | 69.72 | 67.28 | 67.91 | 67.21 |
| % UV | 49.77 | 50.38 | 45.52 | 42.53 | 42.84 | 44.4 |
| % IR | 37.88 | 37.77 | 41.95 | 31.65 | 30.74 | 29.55 |
| % TOTAL SOLAR | 52.49 | 52.82 | 54.34 | 47.48 | 47.3 | 46.39 |

All of the examples are made using the batch only with no cullet (the broken pieces of glass that are added to the batch feed in production). There are two types of cullet that can be added to the batch to produce glass of the invention: reduced iron glass from glass of the invention and oxidized iron glass. The reduced iron glass cullet has a redox ratio of about 0.5 to 0.6 while the oxidized iron glass has a redox ratio of about 0.18 to 0.26. The redox ratio is defined as the ratio of wt. % FeO/total Fe as wt. % $Fe_2O_3$. For example, if the desired glass of the invention in the examples above uses 2 pounds of anthracite coal for 1000 pounds of sand, then an additional 1.5 pounds of anthracite coal must be added to the batch when the reduced iron glass cullet is added to make 50% of the batch feed to the furnace for a total of 3.5 pounds of anthracite coal per 1000 pounds of sand. For other cullet levels, the anthracite coal is increased or decreased proportionately. If the oxidized iron glass cullet is used, more anthracite coal must be added to drive the oxidized cullet toward the reduced iron to make a grey or bronze glass color. For example, if the desired glass of the invention in the examples above uses 2 pounds of anthracite coal for 1000 pounds of sand, then an additional 2.5 pounds of anthracite coal must be added to the batch when the oxidized iron glass cullet is added to make 50% of the batch feed to the furnace for a total of 4.5 pounds of anthracite coal per 1000 pounds of sand.

As can be seen from the examples above, the glass in accordance with the present invention provides for high transmittance, an improved infrared light absorption and an improved ultra violet absorption.

As any person skilled in the art will recognize from the previous description and from the figures and claims, modifications and changes can be made to the preferred embodiment of the invention without departing from the scope of the invention as defined in the following claims.

What is claimed is:

1. A colored glass having a base and a colorant, wherein composition of the colorant by weight of the colored glass comprises:

0.22 to 0.39 wt. % of total iron as $Fe_2O_3$, wherein ratio of FeO to total iron as $Fe_2O_3$ is in a range of 0.35 to 0.64;

0.1 to 0.5 wt. % of manganese oxide as $MnO_2$;

2 to 10 ppm of selenium; and 0 to 20 ppm of cobalt;

wherein the colored glass at 4 mm. control thickness has a light transmittance using illuminant A in a range of 65% to 78%, an infrared transmittance in the range of 22% to 51%, a dominant wavelength using illuminant C in a range of 493 to 577 nanometers and an excitation purity up to 7%.

2. The colored glass of claim 1, wherein the composition of the colorant further comprises up to 1.2 wt. % cerium oxide as $CeO_2$.

3. The colored glass of claim 1, wherein the color of the colored glass is bronze when the excitation purity is in the range of 2% to 7%.

4. The colored glass of claim 3, wherein the dominant wavelength of the bronze colored glass is in the range of 561 to 577 nanometers.

5. The colored glass of claim 3, wherein the amount of selenium to obtain the bronze colored glass is in the range of 3 to 8 ppm.

6. The colored glass of claim 3, wherein the amount of cerium oxide to obtain the bronze colored glass is in the range of 0.5 to 1.0 wt. %.

7. The colored glass of claim 1, wherein the color of the colored glass is gray when the excitation purity is less than 2%.

8. The colored glass of claim 7, wherein the dominant wavelength of the gray colored glass is in the range of 493 to 551 nanometers.

9. The colored glass of claim 7, wherein the amount of cerium oxide to obtain the gray colored glass is in the range of 0.2 to 0.8 wt. %.

10. The colored glass of claim 7, wherein the amount of cobalt to obtain the gray colored glass is in the range of 2 to 12 ppm.

11. The colored glass of claim 1, wherein the amount of total iron expressed as $Fe_2O_3$ is in the range of 0.25 to 0.36 wt. %.

12. The colored glass of claim 1, wherein the amount of manganese oxide as $MnO_2$ is in the range of 0.15 to 0.45 wt. %.

13. The colored glass of claim 1, wherein the infra red transmittance is in the range of 22% to 35%.

14. The colored glass of claim 1, wherein the colored glass at 4 mm. control thickness has an ultra violet transmittance in the range of 35% to 62%.

15. The colored glass of claim 1, wherein the composition of the base by weight of the colored glass is:

68 to 75 wt. % $SiO_2$;

10 to 18 wt. % $Na_2O$;

5 to 15 wt. % CaO;

0 to 10 wt. % MgO;

0 to 5 wt. % $Al_2O_3$; and 0 to 5 wt. % $K_2O$;

wherein the total amount of CaO and MgO is in a range of 6 to 15 wt. % and the total amount of $Na_2O$ and $K_2O$ is in a range of 10 to 20 wt. %.

* * * * *